United States Patent [19]
Soltan et al.

[11] Patent Number: 5,854,613
[45] Date of Patent: Dec. 29, 1998

[54] LASER BASED 3D VOLUMETRIC DISPLAY SYSTEM

[75] Inventors: Parviz Soltan, San Diego; John A. Trias, La Mesa; Weldon J. Dahlke, San Diego, all of Calif.; Robert V. Belfatto, Melbourne Beach; Frank Sanzone, Satellite Beach, both of Fla.

[73] Assignee: The United Sates of America as represented by the Secretary of the Navy, Washington, D.C.

[21] Appl. No.: 687,091

[22] Filed: May 31, 1996

Related U.S. Application Data

[63] Continuation of Ser. No. 215,798, Mar. 16, 1994, abandoned.

[51] Int. Cl.⁶ ............................................. C09G 3/00
[52] U.S. Cl. .................................. 345/32; 345/84
[58] Field of Search .............................. 345/31, 32, 6, 345/84, 85, 13, 14, 16, 72, 201; 348/42, 52, 51; 359/478, 629, 212, 865

[56] References Cited

U.S. PATENT DOCUMENTS

| | | |
|---|---|---|
| 4,023,158 | 5/1977 | Corcoran . |
| 4,160,973 | 7/1979 | Berlin, Jr. ................................. 345/31 |
| 4,692,878 | 9/1987 | Ciongoli ................................... 345/31 |
| 4,799,103 | 1/1989 | Muckerheide . |
| 4,871,231 | 10/1989 | Garcia, Jr. ................................ 348/51 |
| 4,922,336 | 5/1990 | Morton . |
| 5,005,117 | 4/1991 | Ikumi ....................................... 348/42 |
| 5,024,494 | 6/1991 | Williams et al. . |
| 5,042,909 | 8/1991 | Garcia, Jr. et al. . |
| 5,082,350 | 1/1992 | Garcia et al. . |
| 5,162,787 | 11/1992 | Thompson et al. . |

OTHER PUBLICATIONS

Floyd, Digital Fundementals, The 74154 as a Demultiplexer, 1986, pp. 259–260.

"Laser–Based 3D Volumetric Display System", Parviz Soltan et al, 93 TechNet, Jun. 8–10, 1993.

"Laser Based 3D Volumetric Display System", Parviz Soltan et al, SPIE Feb. 9–14, 1992.

"Laser–Based Display Technology Development at the Naval Ocean Systems Center (NOSC)", Thomas Phillips et al, SPIE vol. 1454.

"3D Display Using Laser and Moving Screen", H. Yamada et al, Shibaura Institute of Technology, Tokyo, 1989.

"A 1075–Line Video–Rate Laser Addressed Liquid–Crystal Light–Valve Projection Display", SID, by J. Trias et al., 1988.

"A Real–Time Autostereoscopic Multiplanar 3D Display System", Rodney Don Williams et al, SID 88 Digest.

"Dynamic Transparent Pages in a Volumetric 3D/4D Display", Steve E. Wixson, Electronic Imaging '86.

"A Laser–Based Three–Dimensional Display", Uwe Brinkmann, Lasers & Applications Mar. 1983.

"Image Quality of Volumetric Displays: Emerging Technology and Needed Research", Rodney Don Williams et al, Texas Instruments, Inc., SID 91 Digest.

*Primary Examiner*—Chanh Nguyen
*Attorney, Agent, or Firm*—Harvey Fendelman; Larry Dean Flesner; Michael A. Kagan

[57] ABSTRACT

A system for generating three dimensional images includes a data processor which generates a first data stream representing coordinates along a first axis, a second data stream representing coordinates along a second axis, and a third data stream representing intensities of optical beams. A demultiplexer transforms the first, second, and third data streams into multiple control signals each comprised of elements of the first, second and third data streams. The system further includes an optical energy source for generating an optical signal, and an optical beam steering system which divides the optical signal into multiple optical beams which are individually deflected and intensity modulated under the control of one of the control signals. The optical beams then are recombined and steered to reflect off the reflecting surface of a reflective structure, resulting in the presentation of a 3D image.

19 Claims, 6 Drawing Sheets

LASER BASED 3D VOLUMETRIC DISPLAY SYSTEM

This is a continuation of application Ser. No. 08/215,798 filed 16 Mar. 1994, now abandoned.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to a system which is able to display images in three dimensions (3D), and more specifically, to a system wherein 3D images are projected by multiple laser beams onto a rotating surface which sweeps through a display volume as it rotates.

It has been known in prior art to modulate and scan a laser beam and then to project the laser beam onto an angled rotating screen. The movement of the screen in conjunction with the scanning and modulation of the laser beam produces a sequence of illuminated points displayed within a 3D volume. A rapid display rate produces the effect of a 3D image.

A 3D display system employing a laser beam and a rotating disc is set forth in Garcia, Jr. et al., U.S. Pat. No. 5,042,909. In a system of this type, the light spot is directed only to locations at which an illuminated point is to be displayed. This is referred to as "vector scanning" or "random scanning" as distinct from the left to right, top to bottom scanning referred to as "raster scanning" typically used in two dimensional displays like scanning referred to as "raster scanning" typically used in two dimensional displays like television screens.

It has also been known that the shape of the rotating screen may be planar, as set forth by Garcia, Jr. et al., or helical as described by Thompson et al., U.S. Pat. No. 5,162,787. In general, it is understood that a variety of shapes can be employed for the rotating display surface, providing that a 3D volume is defined by the rotation. It also is understood that a reciprocating "piston-like" movement of the display surface can be employed with a vector scan 3D display system.

A vector scan 3D display system has a maximum display speed determined by the speed at which it is possible to deflect or scan the laser beam. The time required to move the projected beam spot from one point to another point limits the rate at which voxels can be output to the display surface. A 'voxel' is the 3D equivalent of the well known 'pixel' referred to for two dimensional displays. For a vector scan system employing a single projection beam the voxel output rate is equal to or less than the rate at which the scanning means is able to address an arbitrary sequence of voxels.

In the 3D display system disclosed by Thompson et al. a beam of light is first reflected from a two dimensional spatial light modulator. This results in a light beam with a two dimensional cross-sectional pattern. The cross-section of the patterned beam is then projected onto the rotating display surface and sequentially modulated to produce 3D images. A system of this type may be termed a non-scanned system since portions of the beam are selectively blanked while the patterned beam remains stationary. For a non-scanned system the voxel display rate is equal to the modulation rate for the 2D spatial light modulator times the number of modulating elements. Because the number of modulating elements can be made large, it is possible in principle to achieve a very high voxel display rate using such an approach. However, this advantage is effectively negated by the fact that every location in the 2D cross-section of the beam is passively addressed whether the voxel is illuminated or not. Addressing non-illuminated voxels with a mostly blanked projection beam is very inefficient, since the light energy associated with non-illuminated voxels is wasted. This causes a related difficulty in that a very bright light source must be supplied in order to provide an acceptably bright display.

Vector scanning, which directs light beams to selected locations, is an efficient approach which can provide brightly illuminated voxels. As noted above, however, the rate of voxel display for vector scanning is predicated on the inherent speed for light beam deflection obtainable with available scanning means. The number of voxels which can be presented per image frame is an important property of a vector scan 3D display system since it determines how detailed an image can be displayed. An image frame is a sequence of voxels displayed during a frame period, and a frame period is an interval (less than 0.1 seconds) which is short enough that a series of constant or slowly evolving image frames will not appear to flicker.

Therefore, in accordance with this inventive concept a need has been discovered for a 3D display system which has the capability of efficient, bright voxel display combined with a desired high rate of voxel display to provide for flicker-free presentation of complex images in applications such as air traffic display, sonar imaging, computer graphics, and others.

SUMMARY OF THE INVENTION

In accordance with the present invention, the above noted problems of the prior art are mitigated and there is provided a vector scan, multiple light beam 3D display system which is capable of a voxel display rate much greater than is attainable by the practice of the prior art. Parallel processing of image control signals and multiple output light beams are employed in order to present image frames with several times more voxels per frame than prior art vector scan 3D display systems.

The 3D display system in accordance with a first embodiment thereof includes a display surface for receiving a plurality of output light beams. The display surface moves in a 3D volume with a periodic motion, and reflection of the output light beams from the moving display surface produces the effect of a 3D display.

A computer is adapted by means of software programs to provide digital display data which are conveyed to a computer interface circuit. Position sensing means provide position reference signals at specified positions as the display surface moves. The computer interface circuit receives the digital display data and the position reference signals, and produces sequences of digital control signals which are synchronized with the motion of the display surface.

A scanning subsystem driver including digital and analog electronic circuits receives the sequences of digital control signals and generates therefrom multiple parallel channels of analog control signals. Each channel of analog control signals corresponds to a specified output light beam. A scanning subsystem includes passive and active optical components, and the active optical components are operated by the analog control signals from the scanning subsystem driver. The scanning subsystem receives input light beams and derives therefrom a plurality of output light beams which are modulated, deflected, and projected from the scanning subsystem onto the moving display surface, thereby producing a 3D image display.

An optional refinement of the scanning subsystem is provided by optical polarization rotating components and polarization dependent light beam combining components which are disposed so that two independently controlled light beams can be efficiently combined and projected from one output location in the scanning subsystem. The advantage of this refinement is a resulting simplification in display data computations which must include parallax effects resulting from multiple light beam projection paths propagating from multiple output locations.

As a second embodiment of the invention, a multicolor 3D display system is disclosed. In accordance with this embodiment there are provided two or more color subsystems. Each color subsystem includes one or more light beam sources chosen to provide selected colors. Each color subsystem also includes a scanning subsystem and scanning subsystem driver which control multiple light beams, and a computer interface circuit. One or more computers may be used to provide digital display data for all color subsystems. The structure and operation of each color subsystem is substantially similar to the single color 3D display system described hereinabove.

The multicolor 3D display system further includes dichroic light beam reflectors and transmitters disposed to efficiently direct light beams of different colors into coincident projection paths. The light beams then are projected onto a moving display surface to produce a multicolor 3D image.

OBJECTS OF THE INVENTION

An object of the invention is to provide a vector scan 3D display system capable of presenting complex 3D images at a high rate of voxel display by using multiple light beams and parallel processing of image control signals.

A further object of the invention is to provide a multiple beam, vector scan 3D display system which includes two or more color subsystems in order to produce a multicolor 3D display.

DESCRIPTION OF THE INVENTION DRAWINGS

DESCRIPTION OF THE PREFERRED EMBODIMENTS

Figure 1:
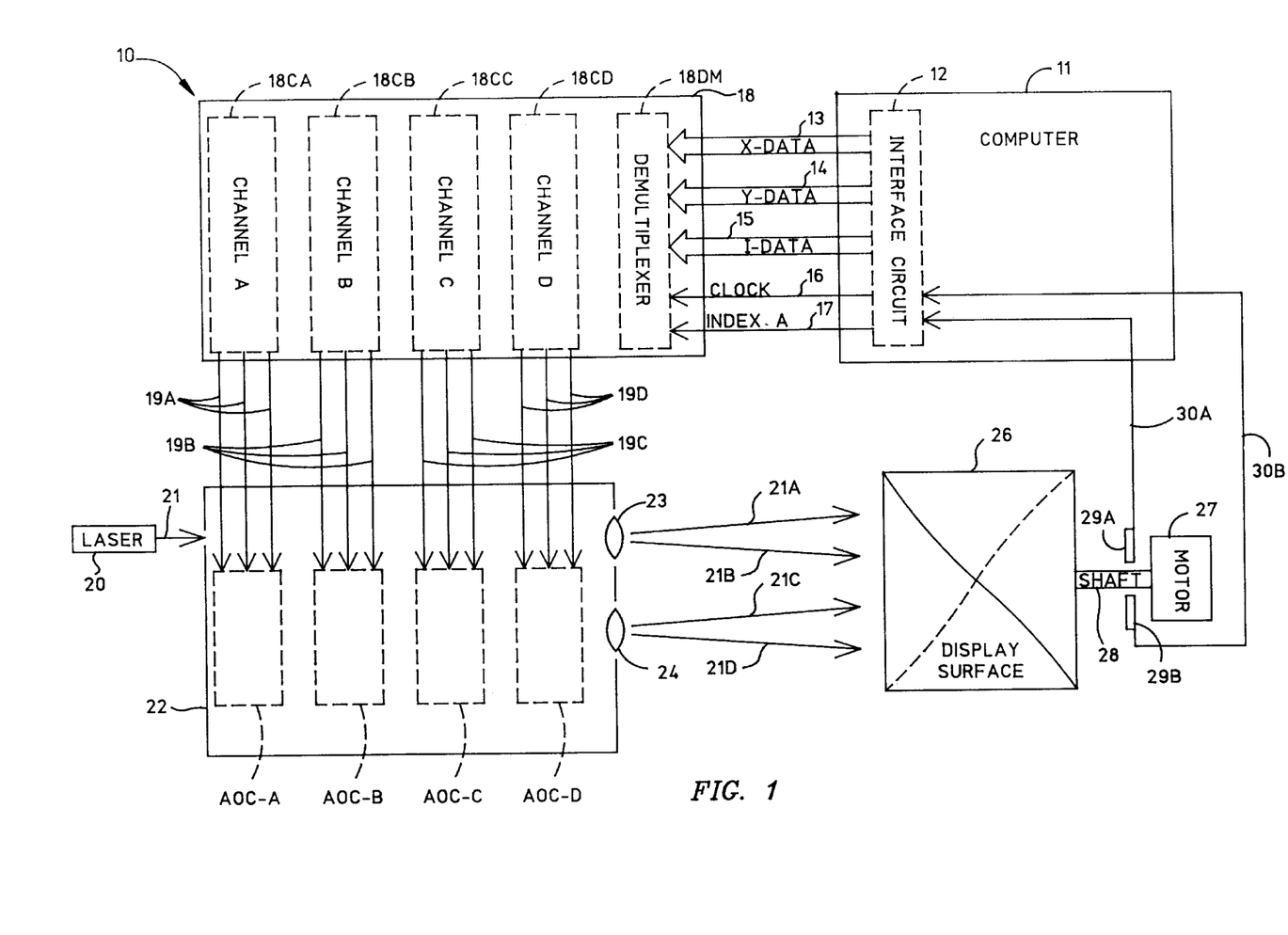
FIG. 1 is a schematic diagram of a 3D display system in accordance with the present invention.

Referring to FIG. 1 there is shown a schematic diagram of a 3D display system 10 in accordance with the present invention. In all figures like numerals refer to like structures. The 3D display system provides four output light beams, 21A, 21B, 21C and 21D, which are projected onto a rotating display surface 26.

The 3D display system includes a computer 11 that is adapted by means of software programs to generate digital display data representing images to be displayed by the system. A method whereby digital display data can be generated by software programs is described hereinbelow by way of example. Other methods can also used for desired applications of the present invention. Writing software programs to perform the operations described hereinbelow is well understood by computer programmers.

A first program, Object Generate, produces Object Data files which include X, Y, and Z coordinate numbers and light intensity numbers representing voxels to compose a 3D object image. The source information for Object Generate may be, for example, numerical computations which calculate points on the surface of a geometrical shape such as sphere. A second program, Display Driver, converts Object Data files into digital display data. The conversion process includes steps whereby X, Y, and Z coordinate numbers are converted into two lateral deflection coordinates (X-deflection and Y-deflection) and a time coordinate (Z-location). The X-deflection and Y-deflection coordinates define a lateral location in the display volume relative to a light beam deflecting means and the time coordinate defines depth location by reference to the periodic motion of the display surface. The digital display data are organized as arrays of data words, each data word representing a voxel. A digital display data word includes bits designating X-deflection, Y-deflection, and output light beam intensity. The array index of a digital display data word specifies the time coordinate.

The digital display data words are conveyed to a computer interface circuit 12 of the 3D display system and stored in memory locations according to the array indices corresponding to time coordinates. The stored digital display data words are sent from the computer interface circuit as synchronized sequences of digital control data. The sequences of digital control data are synchronized to the rotation of the display surface, and the time location of each data word in a data sequence is determined by the memory location at which the data word is stored. The operation of the computer interface circuit is explained further hereinbelow.

Figure 5:
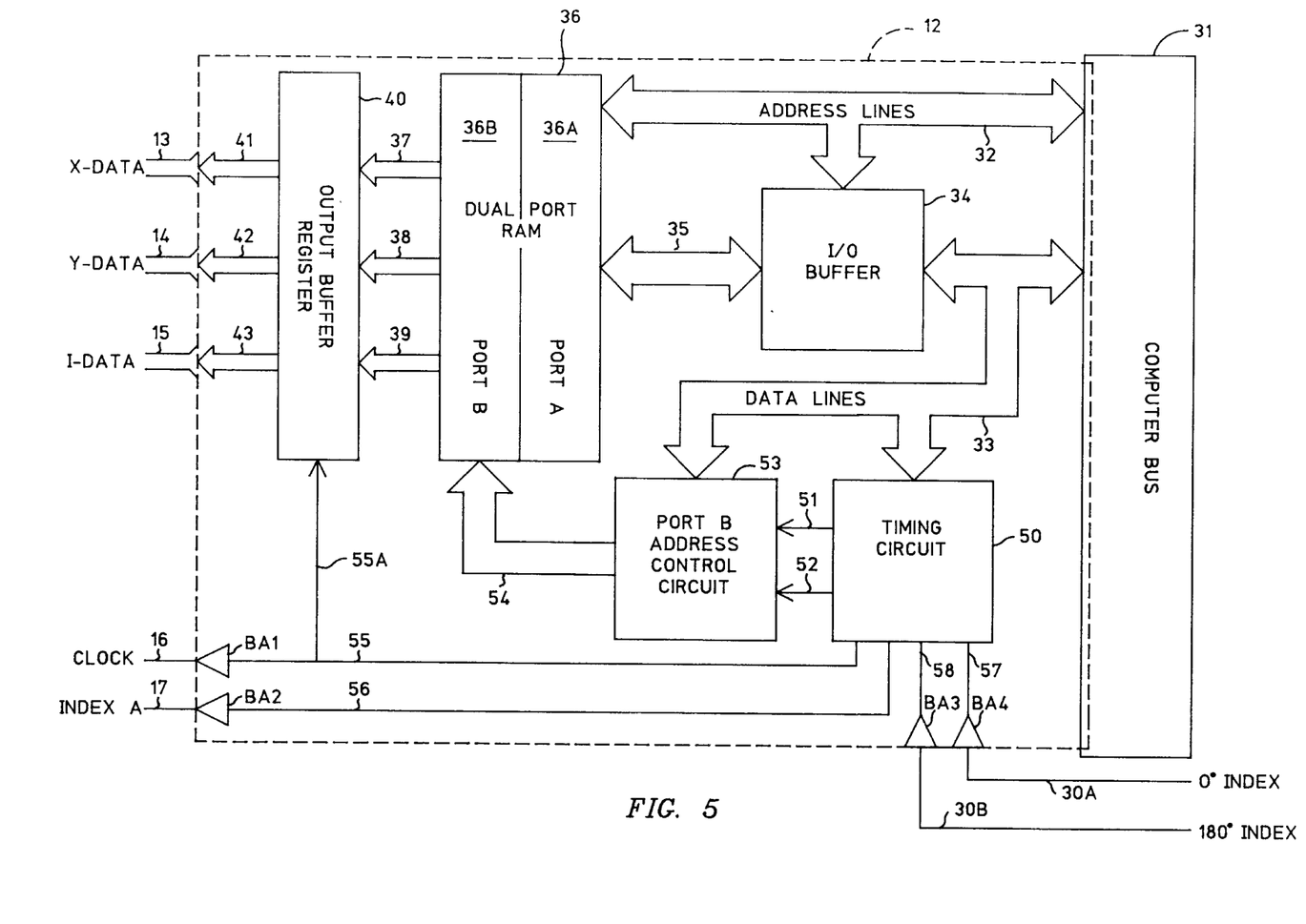
FIG. 5 is a circuit diagram of the computer interface circuit.

The digital display data are transferred to computer interface circuit 12 via a computer bus 31 shown in FIG. 5. The computer interface circuit includes electronic circuits appropriately designed to receive, store and process digital display data from the computer and to send a sequence of digital control signals to a scanning subsystem driver 18 via signal lines 13 though 17. The computer interface circuit receives angle index signals (alternatively referred to as display position reference signals) from sensors 29a and 29b via signal lines 30a and 30b. The computer interface circuit synchronizes the sequence of digital control signals with the rotation of the display surface. The design and operation of the computer interface circuit will be further described hereinbelow.

Signal line 16 conveys clock pulses marking the time intervals allotted to each data set representing a voxel. Line 13 is a parallel cable conveying 12 bits of parallel data representing the X-direction deflection. Line 14 is a parallel cable conveying 12 bits of data representing the Y-direction deflection. Line 15 is a parallel cable conveying 8 bits of data representing voxel intensity I. Line 17 conveys a signal designated as Index A, further explained hereinbelow.

Figure 2:
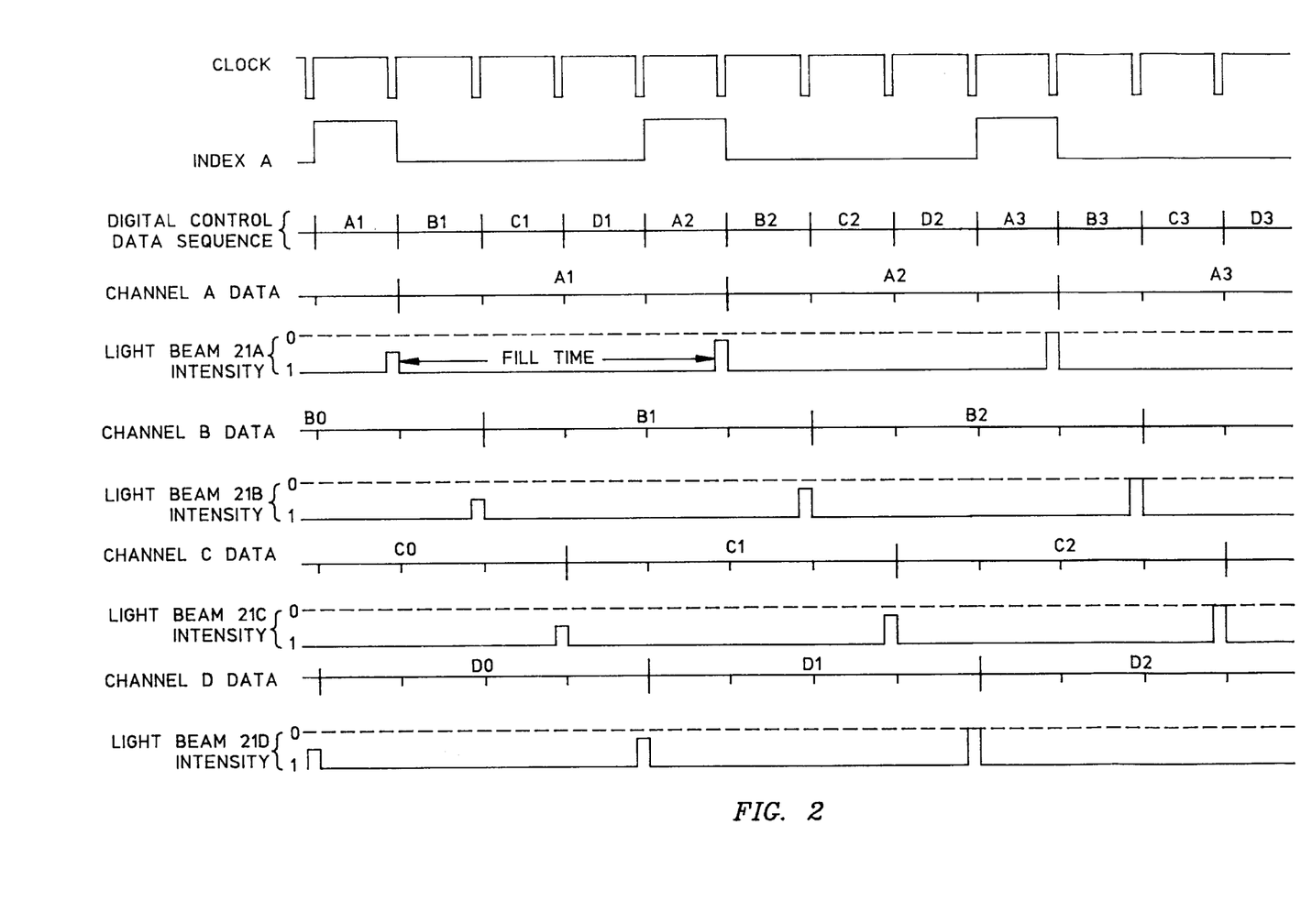
FIG. 2 is a timing diagram for the digital control signals conveyed from the computer interface circuit to the scanning subsystem driver.

In FIG. 2 a timing diagram is shown for the digital control data. The data sequence comprises sets of data representing voxels for four channels, Channels A, B, C and D, which correspond to output light beams 21A, 21B, 21C, and 21D respectively. The data corresponding to each channel is sent sequentially via lines 13, 14, and 15 from the computer interface circuit. The rising edges of clock pulses on Line 16 coincide with transitions between data sets for different channels, and signal Index A is asserted when Channel A data is valid.

Referring further to FIG. 1, the digital control data sent by computer interface circuit 12 is received by demultiplexer circuit 18DM which is included in scanning subsystem driver 18. The demultiplexer circuit stores the data words from lines 13, 14, and 15 as they are received. The data which represent X-position, Y-position, and intensity for a specific channel are stored in specific data storage registers (not shown) corresponding to that channel. The data words for a specific channel are replaced when new data words for that channel are received, as illustrated in FIG. 2. In this way the sequence of digital control data is demultiplexed into four sets of stored data words which represent X-position, Y-position, and intensity for the four respective Channels A, B, C, and D. The rate at which data are updated in each channel is one fourth the rate at which data words for all channels are sent from the computer interface circuit. Electronic circuitry for performing the functions described herein is well known to practitioners skilled in the art of circuit design.

Demultiplexer circuit 18DM is functionally connected (connections not shown) to channel driver circuits 18CA, 18CB, 18CC, and 18CD corresponding to Channels A, B, C, and D, respectively. Data words stored in demultiplexer circuit 18DM are provided as input data to corresponding read-only memories (ROM's, the ROM's are not shown) included in driver circuits 18CA, 18CB, 18CC, and 18CD. For example, data stored in demultiplexer 18DM corresponding to Y-direction deflection for Channel B is conveyed to a Y-driver ROM included in Channel B driver circuit 18CB.

The output data of the ROM's are provided as input data to corresponding digital radio frequency (RF) signal synthesizers (not shown) also included in the driver circuits. In this way the stored data words derived from the digital control signals are converted into RF analog control signals which are suitable for operating acousto-optic modulators and acousto-optic deflectors. Electronic circuits to accomplish the functions herein described are well known.

The scanning subsystem driver produces three RF analog control signals for each of Channels A, B, C, and D. These RF analog control signals are conveyed to scanning subsystem 22 via 12 signal lines. The 12 RF signal lines are shown (grouped according to corresponding channel) as 19A, 19B, 19C, and 19D in FIG. 1. Each of the 12. RF signal lines is connected to a corresponding acousto-optic component in scanning subsystem 22. Individual connections are not shown, but groups of acousto-optic components (AOC) corresponding to respective channels are represented by blocks designated AOC-A, AOC-B, AOC-C and AOC-D in FIG. 1 and FIG. 3. Additional description of the acousto-optic components is given hereinbelow.

Referring still to FIG. 1, a laser 20 provides a vertically polarized light beam 21 which is directed into scanning subsystem 22. Vertical polarization is understood to designate a planar light polarization with the direction of the electric field vector perpendicular to the planar surface on which the optical components are mounted. Horizontal polarization corresponds to electric field vector parallel to the mounting plane of the optical components. These designations are chosen by way of example only. The necessary orientations are determined by the design and mounting of the optical components, which can be otherwise specified as is well known to those skilled in the art.

Figure 3:
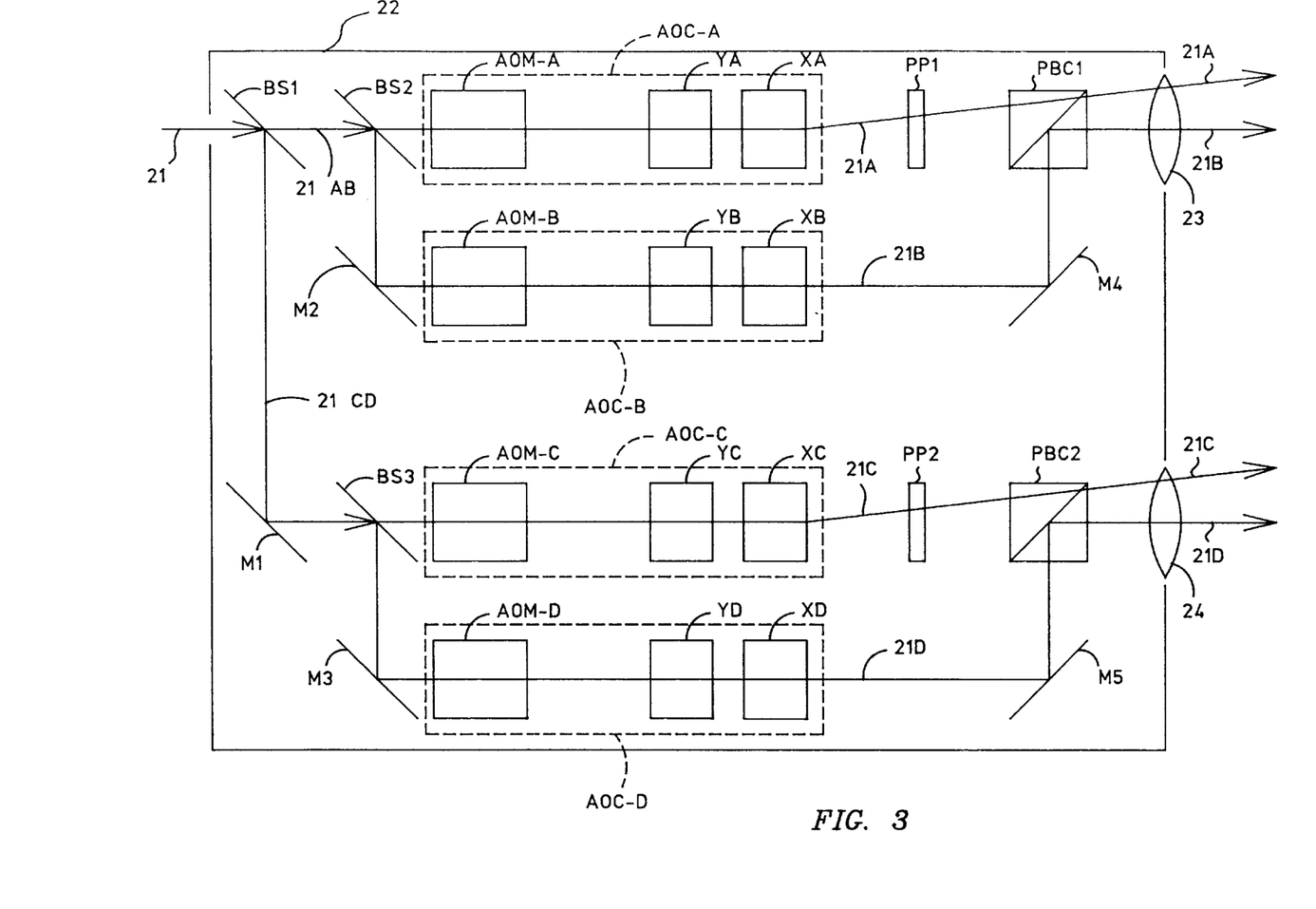
FIG. 3 is a schematic diagram of the scanning subsystem.

Referring now to FIG. 3, scanning subsystem 22 is represented by a schematic diagram. Input laser beam 21 is first split into two equal intensity beams 21AB and 21CD by beam splitter BS1. The two beams are further split into equal intensity beams 21A, 21B, 21C, and 21D by beam splitters BS2 and BS3. Mirrors M1, M2, and M3 are disposed to direct the four beams into four parallel paths. Light beams 21A, 21B, 21C, and 21D are directed through acousto-optic modulators AOM-A, AOM-B, AOM-C and AOM-D, corresponding to Channels A, B, C and D, respectively. Each acousto-optic modulator is operated by a corresponding RF analog control signal from the scanning subsystem driver as explained hereinabove. The RF analog control signal lines are shown in FIG. 1. but not in FIG. 3. Individual acousto-optic components are not illustrated in FIG. 1. The operation of acousto-optic components by providing RF signals is well understood by practitioners skilled in the art.

The acousto-optic modulators are capable of being blanked, thereby allowing no significant light transmission. Continuously variable levels of light transmission from blanked to maximum transmission can be selected by appropriate conditioning of the RF analog control signals as is well known by those skilled in the art of light beam modulation.

A typical mode of modulation timing is as follows. The acousto-optic modulator for a given channel is blanked during the interval ("fill time") wherein the acousto-optic deflectors are changing from one deflection state to another. When the acousto-optic deflector has stabilized at a selected location, the acousto-optic modulator is then turned on to a selected transmission level for a period of time extending until the deflection state of the acousto-optic deflectors is changed to direct the light beam to a new location. Timing and exemplary intensities for the four light beams are illustrated in FIG. 2. Zero represents blanked, and 1 represents maximum transmission. The blanking of the light beams during the fill time intervals is controlled by standard electronic timing circuits (not shown) which are included in channel driver circuits 18CA, 18CB, 18CC, and 18CD. When the light beams are not blanked, the intensities are selected via the digital and analog control signals as recited hereinabove. Other modes of modulation timing (for example, leaving the light beams on continuously) are possible also. The typical mode of modulation timing described hereinabove is an example of a desirable mode of operation.

Light beams 21A 21B, 21C and 21D propagate through acousto-optic beam deflectors XA, YA, XB, YB, XC, YC, XD, and YD as illustrated in FIG. 3. Beam deflectors YA, YB, YC, and YD are oriented for Y-direction deflection and beam deflectors XA, XB, XC, and XD are oriented for X-direction deflection. For purposes of example, the X-direction may be in the plane of the illustration and the Y-direction perpendicular to the plane of the illustration. Each acousto-optic deflector is operated by an RF analog control signal corresponding to its respective channel and deflection direction as explained hereinabove.

Light beams 21A and 21C propagate through birefringent polarization rotating plates PP1 and PP2. The polarization rotating plates convert the vertical polarization of the beams to horizontal polarization. Mirrors M4 and M5 direct beams 21B and 21D, which remain vertically polarized, into polarization sensitive beam combiners PBC1 and PBC2, respectively. Horizontally polarized beams 21A and 21C also are directed into beam combiners PBC1 and PBC2, respectively. The polarization senstive beam combiners combine the light beams without significant energy loss. Without the use of orthogonal polarization beam combination an energy loss of at least 50% would occur in each beam when passing through beam combining components. Therefore it is understood that the refinement of the scanning subsystem represented by the polarization sensitive beam combination method is a desirable, but optional refinement. Less desirable alternatives include not combining the beams and using less efficient beam combination methods. The desirability of combining beams was explained hereinabove.

Referring jointly to both FIG. 3 and FIG. 1, it can be seen that after passing through the beam combining components, the light beams 21A and 21B are focussed onto a rotating display surface 26 by projection len 23, and light beams 21C and 21D are focussed by projection lens 24. It is understood that although the beam combining process causes light beams 21A and 21B to be projected in such a manner that they appear to have almost coincident deflection points, they are nevertheless capable of being deflected in independent directions. This is likewise true for light beams 21C and 21D.

An alternative design of the scanning subsystem would include the use of two or more input light beam sources in place of a single beam source as disclosed hereinabove. The disadvantage of this approach is that lasers which may be employed for this purpose may be bulky and/or expensive. Thus, use of a single laser beam source is generally more desirable. However, the invention herein disclosed comprehends the use of a plurality of input light beam sources for the scanning subsystem within the scope of the invention.

Figure 4:
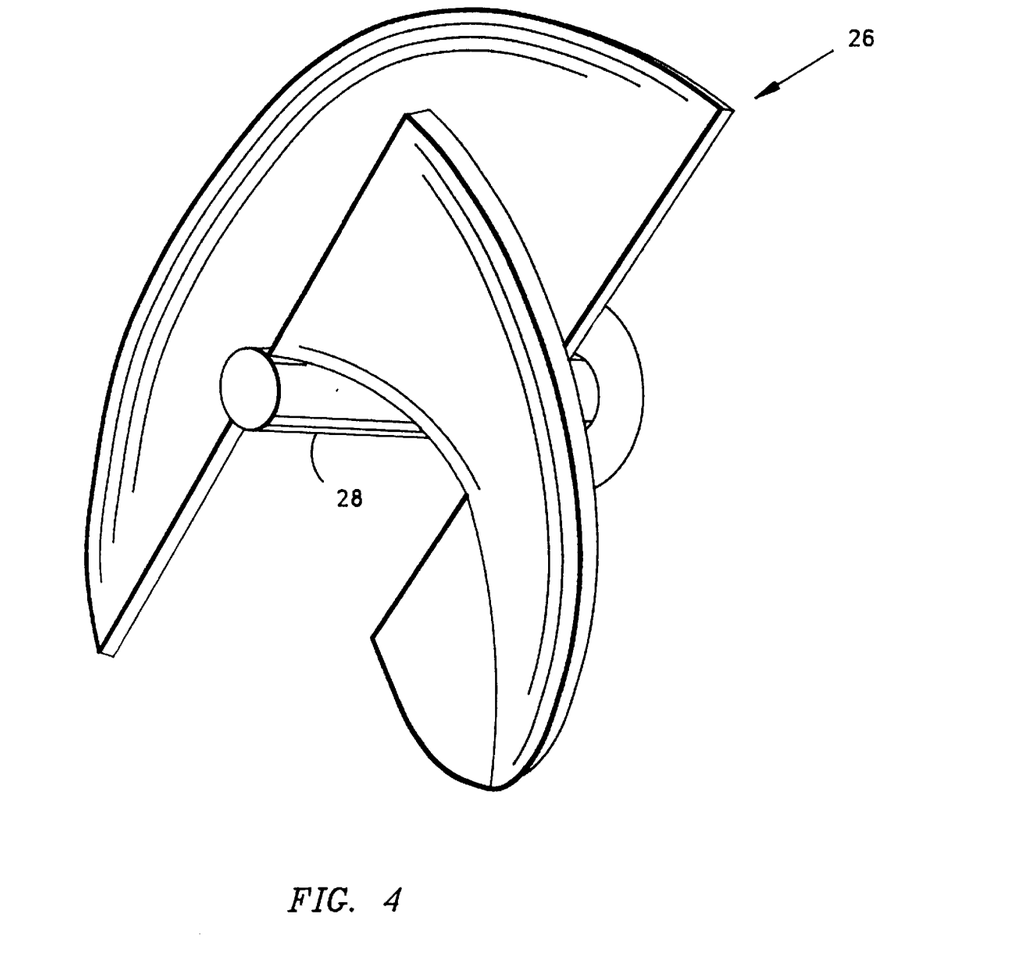
FIG. 4 is an illustration of the rotating display surface.

Referring now to FIG. 4, rotating display surface 26 is shown. The shape of the rotating surface is an axially symmetric double helix mounted on a shaft 28 as illustrated. The salient property of this surface is that it will coincide with itself after a 180 degree rotation about the shaft axis. An advantage of the double helix configuration is that the even symmetry of the design reduces vibration which might be caused by imbalance when the surface rotates. The practice of the present invention comprehends that other display surface shapes with differing rotational symmetries can be substituted, providing that synchronization means as described herein are modified accordingly. The present invention also comprehends the use of display surfaces moving with reciprocal motion, or other periodic motions which define a 3D display volume, in conjunction with suitable means for generating position reference signals.

Referring again to FIG. 1, the position of shaft 28 is detected by sensors 29a and 29b and conveyed via lines 30a and 30b to computer interface circuit 12 by a series of angle index pulses (also referred to as display position reference signals) which occur when the display surface position is at reference points designated as 0 and 180 degrees. These angle index pulses are generated by sensors 29a and 29b which may be optical sensors, magnetic sensors or other suitable position sensing components. Alternatively, a single sensor may be disposed to detect two marks placed on the shaft. The number of angle index pulses and the means of generation can be chosen in many ways as is well understood. The angle index signals are conveyed by signal lines 30a and 30b to computer interface circuit 12 and used for timing control functions. Timing control methods are described further hereinbelow.

Referring now to FIG. 5, a simplified functional circuit diagram of the computer interface circuit is presented. The computer interface circuit is connected to computer bus 31 of a computer 11 such as an IBM personal computer. Parallel connecting lines 33 convey data words to and from the computer and a buffer circuit 34 which enables input/output (I/O) operations between computer bus 31 and port 36A of dual port random access memory (RAM) 36. Buffer circuit 34 is designed to accommodate 16 bit word I/O to the computer bus and 32 bit I/O to the RAM. Alternatively, 32 bit word I/O from the computer can be accommodated by suitable design as is known to electronic circuit designers. Many choices of data word size and I/O circuit designs are known to circuit designers, and the configuration specified herein is only an example of what can be utilized within the scope of the instant invention.

RAM 36 functions as a 32 bit, 64K word dual port random access memory circuit. A suitable means for realizing this circuit is to employ sixteen integrated circuits (IC's) of a type specified as IDT 7006S. These IC's are 8 bit word by 16K word ICs which can be interconnected to obtain circuit RAM 36.

The RAM address for I/O operations to port 36A is selected via parallel address lines 32. Other standard circuitry (not shown) is included in the computer interface circuit for communicating address and command information between the computer bus and the interface circuit.

Still referring to FIG. 5, timing circuit 50 is also included in the computer interface circuit. The timing circuit includes a programmable clock and other standard electronic components (not shown) which are operably interconnected to provide clock pulses to port B address control circuit 53 via line 51, clock pulses to output buffer register circuit 40 via lines 55 and 55a, and clock pulses to signal line 16 via line 55 and output buffer amplifier BA1. The clock pulse on line 55 increments the port B memory readout address. Suitable delay on the order of 175 nS is introduced between the pulses on line 51 and the pulses on line 55 to allow new address data to be gated into output buffer register 40. Digital control signal Index A also is generated by timing circuit 50 and conveyed to line 17 via line 56 and output buffer amplifier BA2. Index A is asserted when Channel A data is present at the output buffer register.

Data from computer bus 31 is conveyed by parallel data line 33 to I/O buffer 34, to timing circuit 50, and to port B address control circuit 53. The timing circuit includes a programmable clock (not shown) which can be set by the computer. The port B address control circuit contains an initial address register (not shown) which can also be set by the computer.

Angle index pulses from lines 30a and 30b are conveyed to timing circuit 50 via input buffer amplifiers BA3 and BA4 and lines 57 and 58. The timing circuit uses these pulses to synchronize pulses on signal line 51 which initialize the status of the port B address control circuit 53, and to initiate a sequence of programmed clock pulses which are output via lines 52 and 55. The Index A signal also is generated by the timing circuit 50 and output via line 56. Circuitry for performing the timing functions as described herein is well known, and alternative means for providing the timing functions are comprehended within the scope of the present invention.

Port B address control circuit 53 receives an initial address data word from the computer bus via data line 33 and stores the initial address in a storage register (not shown). The initial address is transferred to a counter (not shown) and output 36B of RAM 36 via data lines 54 when an initialization pulse appears on line 51. Subsequent clock pulses on line 52 increment the counter thereby providing subsequent address locations to RAM port 36B.

Referring still to FIG. 5, the output from port 36B of RAM 36 is connected to output buffer register 40 via data lines 37, 38, and 39. The purpose of output buffer register 40 is to store or latch the output data from port 36B when a clock pulse is received from timing circuit 50 via line 55A. The output data from buffer 40 are the sequences of digital control data which are sent from the computer interface circuit to the scanning subsystem driver as described hereinabove. The output data are transferred from output buffer 40 via output parallel data lines 41, 42, and 43 which are connected to lines 13, 14, and 15 respectively. As an example, data lines 41 may convey 12 parallel bits of data representing X-direction deflection, data lines 42 may convey 12 parallel bits of data representing Y-direction deflection, and data lines 43 may convey 8 parallel bits of data representing light beam intensity. This organization of data is consistent with the use of a dual port RAM 36 which includes 32 bit words at each address location. A requirement of the RAM 36 is that the number of data words which can be stored therein must be equal to or greater than the total number of voxels which are to be displayed in each image frame.

A suitable method for controlling and adjusting the speed of motor 27 is as follows. The speed of the motor is controlled by a DC voltage (not illustrated) which is set via a digital to analog converter (not illustrated). The set motor speed is determined by timing the rotation period of shaft 28. The rotation period of shaft 28 is timed by clock pulses produced within timing circuit 50. The clock pulses increment a counter (not shown) included in timing circuit 50. The number in the counter is transferred to a motor speed storage register (not shown) and reset when the 0 degree angle index pulse is received via line 30a. The number in the storage register can be read by the computer at any time, and represents the number of clock periods per shaft rotation. The speed of the motor is then adjusted by the computer as needed in order to equalize the image frame period with 180 degrees of display surface rotation. It is understood that many methods for controlling speed of the display surface rotation are possible, and other methods are also comprehended within the practice of the present invention as herein disclosed. It is further understood that the display surface can be rotated by means such as air bearing suspension in conjunction with turbine drive, or magnetic levitation and magnetic or gas turbine drive. These and other methods of providing and controlling the periodic motion of the display surface are comprehended within the practice of the instant invention.

Referring to FIG. 1 and FIG. 5, the first embodiment of the invention as described hereinabove is operated as follows. Computer 11 provides a set of data words which together represent at least one frame of image data. These data are transferred to and stored by dual port RAM 36 via port 36A. Once stored in RAM 36, a frame of image data can be repeatedly output from port 36B of RAM 36 (independently from the computer operations) by sequences of address commands provided by address control circuit 53. The sequences of address commands are synchronized with the position of the rotating display surface by means of the initializing pulses and clock pulses generated by timing circuit 50.

The initial address is provided from the computer and stored by address control circuit 53. Subsequent addresses are generated by incrementing a counter (not shown) included in circuit 53. The rate of output data transfer is set by the computer via the programmable clock included in timing circuit 50. The clock rate and the rotation rate of the display surface are selected so that an image frame of data can be output during 180 degrees of display rotation. At typical clock period may be 1.3 microseconds and a typical frame period may be 50 milliseconds, thereby providing 38,461 voxels per frame.

It can now be understood that the computer interface circuit as described hereinabove is capable of producing a continuing series of image frames after at least one image frame of data has been supplied by the computer. Data stored in RAM 36 can be used repeatedly to produce subsequent image frames. Modification of the stored data can be accomplished independently of the digital control signal output operation. Any part of the image frame data can be selectively altered by altering stored data at selected addresses in RAM 36 via port 36A. This can be accomplished without interfering with the data sending process.

Continuing the description of the operation of the invention, the sequences of digital control signals are sent from computer interface circuit 12 to scanning subsystem driver 18 (shown in FIG. 1). The scanning subsystem driver demultiplexes the data sequences to produce sequences of control signals for four output light beams as described hereinabove. An important result of the demultiplexing procedure is that each of the four display channels A, B, C and D receives data at a rate which is one-fourth of the rate at which the digital control signal data is sent from the computer interface circuit. As an example, if the clock period is 1.3 microseconds, each channel receives new data every 5.2 microseconds. Acousto-optic deflectors suitably adapted according to art known to practitioners in the field for use in this invention require a "fill time" of about 5 microseconds to change from one deflection state to another deflection state. Consequently, a voxel display rate of one voxel every 1.3 microseconds can be accomplished by the practice of the instant invention even though available deflection means require approximately four times longer to change deflection state. This is a significant advantage of the present invention over the practice of prior art, and results from application of the parallel data processing methods in conjunction with a plurality of output light beams to display unitary images.

The scanning subsystem driver receives the digital control signals and generates therefrom 12 analog control signals which operate the acousto-optic modulators and deflectors in scanning subsystem 22. The scanning subsystem modulates, deflects, and projects four output light beams 21A, 21B, 21C, and 21D which are derived from input light beam 21. The projected light beams are incident on rotating display surface 26.

Referring again to the exemplary numbers given hereinabove, the acousto-optic deflectors for a given light beam require a fill time of 5 microseconds to stabilize at a selected deflection state. The corresponding acousto-optic modulator is blanked during the fill time. The modulator is then turned on to a selected transmission level for 0.2 microseconds until the control signals are updated for relocation to the next pixel. This mode of modulation timing was discussed hereinabove.

With a voxel output period of 5.2 microseconds per light beam, the total voxel output rate is 38,461 voxels per frame time. The result is obtained by the parallel operation of all four light beams, each of which is providing 192,308 voxels per second. The selected frame time is 50 milliseconds corresponding to 180 degrees of display rotation.

The large number of voxels which can be presented per image time makes possible a high resolution 3D display. This is a significant advantage of the instant invention over the practice of prior art.

As a second embodiment of the invention, a multicolor 3D display system is disclosed. In accordance with this embodiment there are provided two or more color subsystems, each color subsystem comprising one or more light beam sources, a scanning subsystem and scanning subsystem driver which control multiple light beams, and a computer interface circuit. One computer may provide digital display data for all color subsystems. The description and operation of each color subsystem differs substantially from the first embodiment described hereinabove only insofar that suitable light beam sources are chosen to provide the desired color for each color subsystem.

Figure 6:
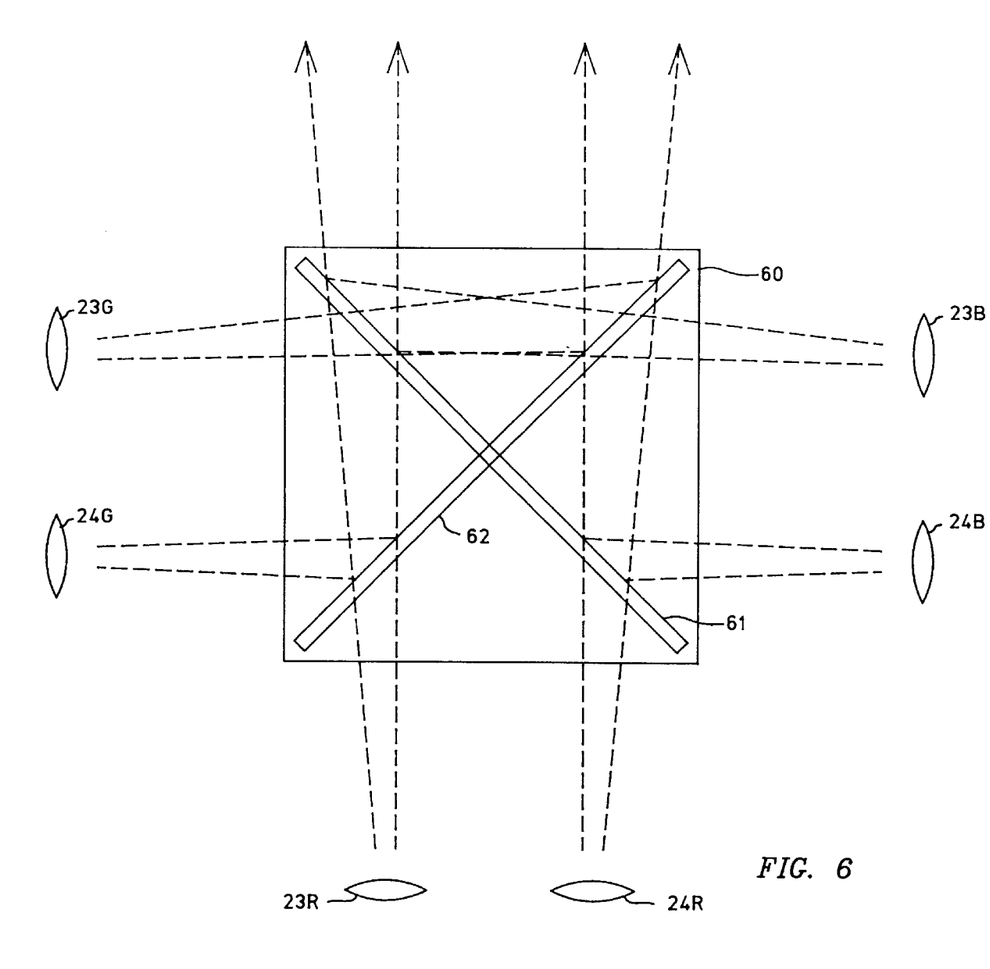
FIG. 6 is a diagram of a dichroic light beam combining component.

Referring to FIG. 6, the multicolor display system further includes a light beam combining optical component 60 which includes dichroic light beam reflectors and transmitters disposed to efficiently direct light beams of different colors into coincident propagation paths. In FIG. 6 there are shown output lenses 23R and 24R belonging to a red color subsystem; lenses 23G and 24G belonging to a green color subsystem, and lenses 23B and 24B belonging to a blue color subsystem. Two light beams are propagated from each output lens as described hereinabove.

The light beams from the color subsystems are combined by an optical component 60. Optical component 60 includes a dichroic element 61 which transmits red and green light and reflects blue, and a dichroic element 62 which transmits red and blue light and reflects green.

The combined light beams are projected onto a rotating display surface as described hereinabove, thereby presenting a multicolor 3D display.

obviously, many modifications and variations of the invention are possible in light of the above teachings. It is therefore to be understood that within the scope of the appended claims the invention may be practiced otherwise than as has been specifically described.

What is claimed is:

1. A system for generating images, comprising:
a data processor which generates a first data stream representing coordinates along a first axis, a second data stream representing coordinates along a second axis, and a third data stream representing the intensities of multiple optical beams;
a demultiplexer which generates control signals in response to receiving said first, second, and third data streams;
an optical energy source which generates an optical signal;
an optically reflective structure which defines a display volume when subjected to periodic motion; and
an optical beam steering system which (1) divides said optical signal into multiple optical beams; (2) deflects and intensity modulates said optical beams under the supervision of said control signals; (3) combines said optical beams into multiple composite optical beams; and (4) simultaneously directs each of said composite optical beams to reflect off said reflective structure at predetermined coordinates within said display volume.

2. The system of claim 1 wherein said optical beam steering system includes optical beam control channels each including:
an acousto-optic modulator for modulating the intensity of one of said optical beams;
a first acousto-optic beam deflector for deflecting said one optical beam along said first axis, and
a second acousto-optic beam deflector for deflecting said one optical beam along said second axis.

3. The system of claim 2 wherein said optical beam steering system further includes a polarization sensitive light beam combining element to combine two of said optical beams having identical polarization states.

4. The system of claim 1 wherein said first axis is orthogonal to said second axis.

5. The system of claim 1 wherein said optical beam steering system further includes at least one polarization rotation plate to transform at least one of said optical beams from a first polarization state to a second polarization state.

6. The system of claim 5 wherein said first and second polarization states are mutually orthogonal.

7. The system of claim 1 wherein said reflective structure rotates.

8. The system of claim 1 wherein said reflective structure moves with periodic motion.

9. A system for generating images, comprising:
a data processor which generates a first data stream representing coordinates along a first axis, a second data stream representing coordinates along a second axis, and a third data stream representing the intensities of an n number of optical beams, where n is a positive integer and n>3;
a demultiplexer which concurrently generates an n number of control signals in response to receiving said first, second, and third streams of data;
an optical energy source for generating an optical signal;
an optically reflective structure which defines a display volume when subjected to periodic motion;
an optical beam steering system which (1) divides said optical signal into said n number of said optical beams; (2) deflects and intensity modulates said optical beams under the control of said control signals; (3) combines said optical beams into an m number of composite optical beams, where m is a positive integer, and 1<m<n; and (4) simultaneously directs each of said composite optical beams to reflect off said reflective struture at predetermined coordinates within said display volume.

10. The system of claim 9 wherein said reflective structure includes a helical surface.

11. The system of claim 9 wherein said reflective structure is rotates.

12. The system of claim 9 wherein said reflective structure moves with periodic motion.

13. The system of claim 9 wherein said optical beam steering system includes said n number of optical beam controllers, each including:
an acousto-optic modulator for modulating the intensity of one of said optical beams;
a first acousto-optic beam deflector for deflecting said one optical beam along said first axis, and
a second acousto-optic beam deflector for deflecting said one optical beam along said second axis.

14. The system of claim 13 wherein said optical beam steering system further includes at least one polarization rotation plate to transform at least one of said optical beams from a first polarization state to a second polarization state.

15. The system of claim 14 wherein said first and second polarization states are mutually orthogonal.

16. The system of claim 14 wherein said optical beam steering system further includes a polarization sensitive light beam combining element to combine two of said optical beams having identical polarization states.

17. The system of claim 9 wherein said first axis is orthogonal to said second axis.

18. A system for generating three dimensional images, comprising:

a data processor for generating a first data stream representing coordinates along a first axis, a second data stream representing coordinates along a second axis, and a third data stream representing the intensities of multiple optical beams;

demultiplexer for generating control signals in response to receiving said first, second, and third data streams;

an optical energy source for generating an optical signal;

an optically reflective structure for defining a display volume when subjected to periodic motion; and an optical beam steering system for (1) dividing said optical signal into multiple optical beams; (2) deflecting and intensity modulating said optical beams under the supervision of said control signals; (3) combining said optical beams into an n number of composite optical beams, where n is a positive integer and n>1; and (4) simultaneously directing each of said composite optical beams to reflect off said reflective structure at predetermined coordinates within said display volume, where each composite optical beam provides a voxel display rate, VDR, so that said optical beam steering system has a total voxel display rate of n·VDR.

19. A system for generating images, comprising:

a data processor for generating a first data stream representing coordinates along a first axis, a second data stream representing coordinates along a second axis, and a third data stream representing the intensities of an n number of optical beams, where n is a positive integer and n>3;

a demultiplexer for concurrently generating an n number of control signals in response to receiving said first, second, and third data streams;

an optical energy source for generating an optical signal;

an optically reflective structure for defining a display volume when subjected to periodic motion; and an optical beam steering system for: (1) dividing said optical signal into said n number of said optical beams; (2) deflecting and intensity modulating said optical beams under the control of said control signals; (3) combining said optical beams into an m number of composite optical beams, where m is a positive integer, and 1<m<n; and (4) simultaneously directing each of said composite optical beams to reflect off said reflective structure at predetermined coordinates within said display volume.

* * * * *